United States Patent [19]

Huo

[11] 3,829,663

[45] Aug. 13, 1974

[54] SLIDE RULE WITH DECIMAL POINT LOCATION MEANS

[76] Inventor: Wendell Y. Huo, 6112 N. Damea Ave., Chicago, Ill. 60645

[22] Filed: Mar. 23, 1973

[21] Appl. No.: 344,119

[52] U.S. Cl. ............................ 235/64.3, 235/70 R
[51] Int. Cl. ........................................... G06c 19/02
[58] Field of Search ................ 235/61 DP, 64.3, 70

[56] References Cited
UNITED STATES PATENTS

| | | | |
|---|---|---|---|
| 2,466,883 | 4/1949 | Eckel | 235/64.3 |
| 3,374,947 | 3/1968 | Wern et al. | 235/64.3 X |
| 3,699,313 | 10/1972 | Huo | 235/64.3 |

*Primary Examiner*—Lawrence R. Franklin
*Attorney, Agent, or Firm*—Rummler and Snow

[57] ABSTRACT

A logarithmic scale slide rule having means for readily determining decimal location comprising a system of oppositely-facing base-color and contrast-color brackets enclosing each 1 to 9.9999 scale range, and accompanying base-color and contrast-color check marks to indicate the value of "positive one" for multipliers, or "negative one" for dividers, the base-color and contrast-color check marks being for base-color and contrast-color slider scale numbers, respectively, i.e., conventional black and red scales, said check marks being associated with brackets of the same color, and the sum of the plus and minus values of the check marks encountered in the solution of a given problem together with the sum of the plus and minus decimals of the problem numbers will represent the power of ten for the problem.

3 Claims, 3 Drawing Figures

SLIDE RULE WITH DECIMAL POINT LOCATION MEANS

This invention is related to that disclosed in my U.S. Pat. No. 3,699,313 and is intended to be an improvement thereof.

BACKGROUND OF THE INVENTION

Generally a slide rule of multiplication and division is composed of an upper group of folded scales DF in an upper stationary body part, and associated slider scales CF and CIF in a slider body; and a lower regular scales with main scale D in a lower group of stationary body part, and associated slider scales C and CI in the slider body. Conventionally, numbers and letters in the inverted scales CIF and CI are printed in red and those in other scales are printed in black. Generally, however, the slide rule does not help to locate a decimal point in a resultant, so the operator has to make a separate rough calculation to locate a decimal point. Some slide rule users prefer to limit themselves to the uses of scales D and C only and in so doing, the decimal point can be located by counting the number of right hand projections of the slider, but at the same time, all the advantages pertaining to the use of other scales generally present on the rule would be lost. It is the object of this invention to provide a simple decimal locating system accommodating the full range of conventional slide rule scales.

SUMMARY OF THE INVENTION

A main scale D or DF and a slider scale C or CF are of a base color, i.e., black, and an inverted slider scale CI or CIF is of a contrast color, i.e., red. Thus a bracket or a check mark of the base color may be called a base bracket or a base check mark; and a bracket or a check mark of the contrast color may be called a contrast bracket or a contrast check mark.

According to my invention, a base bracket facing to the right is printed at each numeral 1 of main scale D or DF to include the numeral 1 and a contrast bracket facing to the left is printed at the numeral 1 of main scale DF or at the second numeral 1 of main scale D to include the divisional reading 9.999. Regardless of scale reading direction, the numeral 1 at the left end of scale D, C or CI is called the first numeral 1 and the numeral 1 at the right end of scale D, C or CI is called the second numeral 1. Similarly, a base bracket facing to the left is printed at the numeral 1 of the slider scale CIF, or at the second numeral 1 of the slider scale CI to include the divisional reading 1.0001, or at the second numeral 1 of the slider scale C (if this is the only slider scale in that group of scales) to include the divisional reading 9.9999; and a contrast bracket facing to the right is printed at the numeral 1 of the slider scale CIF, or at the first numeral 1 of the slider scale CI to include the divisional reading 9.9999, or at the first numeral 1 of the slider scale C (if this is the only slider scale in that group of scales) to include the divisional reading 1.0001. A base check mark is printed at each base bracket and a contrast check mark is printed at each contrast bracket.

The base and contrast brackets function as directional symbols to indicate the one and ten ends of the logarithmic scale to which they are applied and it will be understood that any appropriate symbol for that purpose may be employed, such, for example, as an arrow or check mark of the appropriate color.

The main scale DF or D, which is black, is used to enter the first number of a problem, to be multiplied or divided, and to furnish the resultant to the operation of the last number. The operation of a first number, that is its being hairline-intersected, does not involve multiplication or division, nor does the reading of a resultant. One of the slider scales CF, CIF, or C, CI is used to enter any number other than the first number, whether it is a multiplier or divider, and its operation, that is the slider-moving of the number to the hairline or hairline-intersecting, involves multiplication or division which produces an increase or decrease by one or zero in decimal value. Therefore the bracket and check mark system includes the main scale for position reference only and only the operating number in a slider scale included in the same scale group as the main scale is taken for decimal evaluation.

A "scale group" consists of a black or base scale, on a fixed number of the slide rule, and at least the nearest red or contrast scale on the slider; and a conventional slide rule has two scale groups, upper and lower.

The positive decimal value of a problem number is the number of digits preceding the first digit ahead of the decimal point regardless of the number of digits following the decimal, i.e. the decimal value of 345.01 is +2. When the number begins with a decimal point, the negative decimal value is the number of zeros following the decimal plus one, i.e. the decimal value of 0.0345 is −2.

The factors or numbers making up the problem have two colors, i.e. base or black and contrast or red, and since, in the course of solving any problem, the first number is entered into the main scale, which is black, the first number of the problem is a black number. Successive numbers in alternately different levels of the problem take the color of the next preceding number and successive numbers appearing in the same level of the problem take the color contrasting that of the next preceding number. Thus in the problem $X = (1 \times 3 \times 5 \times \bar{6} \times 7)/(2 \times 4)$, the numbers 1, 2, 3, 4 and 5 are all black, the number 6 is red and the number 7 is black.

To set up the problem to be solved, the problem should be written out with the multipliers and dividers grouped at the beginning of the problem, multipliers being upper level numbers and dividers being lower level numbers, and lower level numbers should alternate with upper level numbers in their spacing, i.e. $X = (1 \times 3 \times 5 \times 6 \times 7)/(2 \times 4)$ would appear as $X = (1 \times 3 \times 5 \times \bar{6} \times 7)/(2 \times 4)$. This shows the sequence of operations and the numbers in such a problem would be worked in the order of 1, 2, 3, 4, 5, 6 and 7. The lower level numbers alternate with the upper level numbers and the number 6 is a red number, designated by a bar marked across the top of the number, because it directly follows a black number 5.

To determine whether each number of the problem has a plus or minus decimal value or no decimal value, the operator must observe the color of the nearest hairline facing directional symbol bracket in the group of scales in which the problem is being worked. If the color of the bracket or directional symbol and its accompanying check mark are the same as the color of the operating number under the hair line, a check mark should be placed next to the corresponding number in the written problem. Otherwise the indication is that the number has zero decimal value.

Since a check mark at a number in the upper level of a problem means a decimal value of plus one for that number and a check mark at a number in the lower level of the problem means a decimal value of minus one for that number, the sum of the upper level check mark plus the sum of the decimal values of the upper level numbers in the problem, less the sum of the lower level check marks plus the sum of the decimal values of the numbers in the lower level of the problem will equal the number of decimal places for the resultant or problem answer.

Thus, in the solution of a given problem, the first number to be multiplied or divided is entered in a main scale for hairline intersection but would receive no decimal value and the next number being a multiplier or divider is entered into one of the base or contrast color scales for operation and becomes a number of that scale color and would receive a decimal value of +1 if in the upper or multiplier level of the problem, or −1 if in the division or lower level of the problem, provided that its color matches that of a check mark at the nearest facing bracket. The said next number, however, would receive zero decimal value in either level of the problem, if its color does not match that of a check mark at the nearest facing bracket.

DESCRIPTION OF THE PREFERRED EMBODIMENTS

Figure 1:
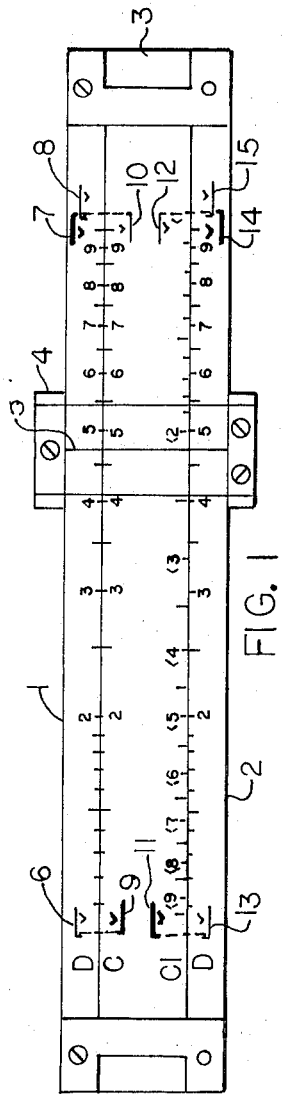
FIG. 1 shows a slide rule having an upper group consisting of main scale D and slider scale C and a lower group consisting of main scale D and slider scale CI. All of the elements of the inverted scale CI are printed with a color contrasting that of the other scales and the arrowheads preceding the numbers on this scale are used to indicate the reading direction of the scale. The lighter-line drawing of the brackets and check marks in the upper and lower group of scales indicate that they should be printed in the base color of the main scales and the heavy-line drawing of the brackets and check marks in the upper and lower group of scales indicate that they should be printed in the contrasting color.

As shown in FIG. 1, the basic slide rule embodying my invention comprises the upper and lower body members 1 and 2, a slider 3 and movable indicator 4 having hairline 5. The slide rule also comprises the scales D, C and CI as stated above. Reference numerals 6 through 15 are the base-color and contrast-color brackets each having a check mark of the same color.

Figure 2:
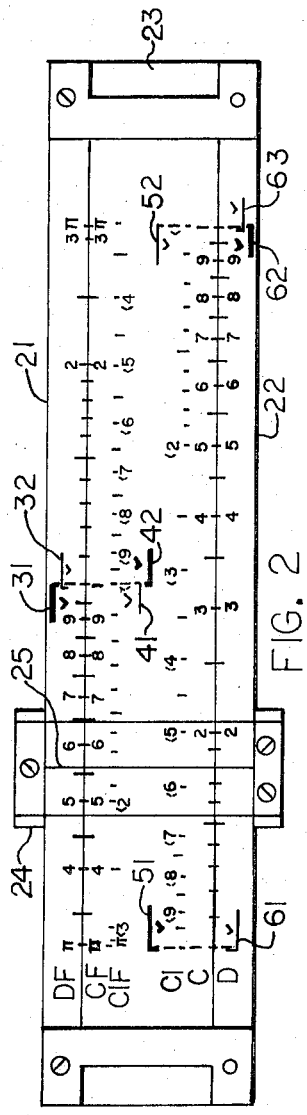
FIG. 2 shows a conventional slide rule having an upper group consisting of main scale DF and two slider scales CF and CIF and a lower group consisting of main scale D and two slider scales C and CI. The entire inverted scales CIF and CI should be printed in the contrasting color. The lighter-line drawing of the brackets and check marks on the upper and lower groups of scales indicate that they are printed in base color and the heavy-line drawing of the brackets and check marks indicate that they are printed in the contrasting color.

FIG. 2 shows another form of slide rule embodying my invention and comprising the upper and lower body members 21 and 22, a slider 23 and an indicator 24 having hairline 25. Reference numerals 31 and 32 are the contrast and base color brackets in main scale DF. Reference numerals 41 and 42 are the base-color and contrast-color brackets in slider scale CIF. Reference numerals 61, 62 and 63 are the base, contrast and base-color brackets, respectively, in main scale D; and numerals 51 and 52 are the contrast-color and base-color brackets in slider scale CI. Each bracket has a check mark of the same color. The scales C and CF have no brackets because they are intermediate scales in their respective groups and it is the group brackets that determine the decimal value of the operated number.

Figure 3:
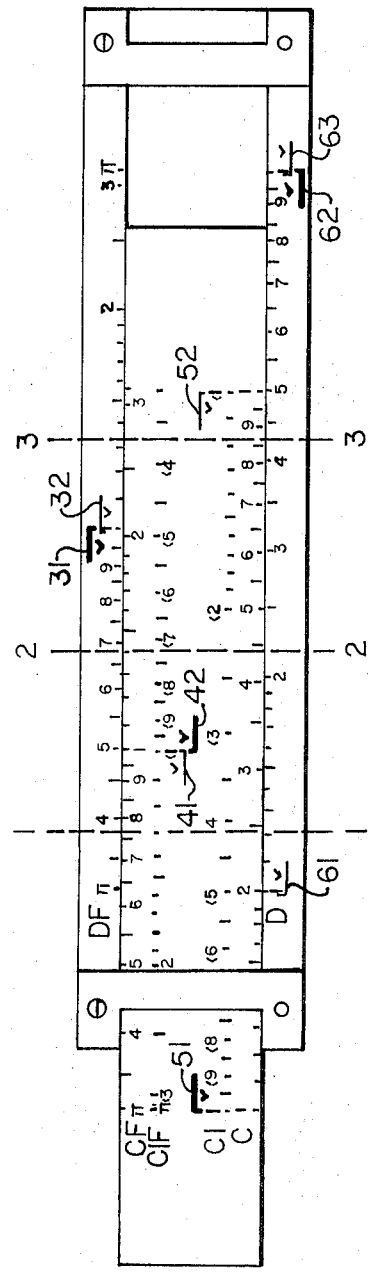
FIG. 3 shows the slide rule of FIG. 2 with the slider being shifted to one side; and lines 1—1, 2—2 and 3—3 are the various hairline positions referred to in the following text.

FIG. 3 shows the same slide rule of FIG. 2 but its slider has been moved to the left side in operation of some typical problems. Line 1—1 is the first hairline position, line 2—2 is the second hairline position, and line 3—3 is the third hairline position that may occur during the solution of a problem.

The nearest bracket facing line 1-1 intersecting a number on scale CF or CIF is the base bracket 41. The nearest brackets facing line 2—2, which intersects a number at scale CF or CIF, are base brackets 31 and 42. Brackets 31 and 42 being of the same color may be used alternatively to determine the decimal value of the operated number. With respect to the line 3—3, intersecting a number at scale CF or CIF, the only and nearest facing bracket is the base bracket 32. With respect to the scales C and CI, the nearest, and only, brackets facing the lines 1—1, 2—2, and 3—3 are the base brackets 52 and 61.

DESCRIPTION OF THE PREFERRED MODE OF OPERATION OF THE INVENTION

To operate the slide rule according to my invention take the following steps:

a. Set up the written problem as above described. b. Hairline-intersect the first number of the problem in the main scale of an upper or lower scale group. c. Slider-move the second number, black or red, in the slider scale of its color and of the same group as the scale of the first number to the hairline. If the number was operated in the upper scale group in the slide rule of FIG. 2, look from the hairline toward the center of the slide rule for a nearest bracket on scale DF or CIF facing the hairline (you may or may not find a nearest facing bracket on one side of the hairline); or if the number was operated in the lower group of scales, you may look on either side of the hairline for a nearest bracket in scale D or CI facing the hairline. If the color of the nearest facing bracket and its check mark match the color of the number, mark a check mark at the number in the written problem, otherwise leave the number unmarked.

The operation of the number "1" as a multiplier or divider is an exceptional case in which the operator does not have to look for a nearest facing bracket and the check mark because the multiplication or division of any number by "1" would evidently have no change in decimal value. If two brackets, one in the main scale and the other in the red slider scale of the same group, are vertically lined up, the one in the main scale would be considered as the nearest facing bracket.

*d.* Hairline-intersect the third number, black or red, in a slider scale of its color in either group of scales as found convenient. Look for the nearest facing bracket and its check mark and mark the number in the problem or leave the number unmarked as explained in (*c*). Repeat (*c*) for the next sequence number and (*d*) for the next sequence number, that is hairline-intersecting and slider-moving of a number are alternately operated until the last number in the problem is taken into operation.

(*e*) Read the resultant at the main scale under the hairline and opposite the last number in the slider scale if the last number was unmarked on the high level of the problem or marked with a bar on the low level (e.g., the last number is hairline-intersected) or read the resultant at any of the two main scales opposite the numeral 1 of the nearest slider scale if the last number was marked with a bar on the high level or unmarked on the low level (e.g., the last number was slider-moved to the hairline).

*f.* Count the number of check marks and the decimal values of the high level numbers and count those of the low level numbers. The high level count minus the low level count is equal to the number of decimal places of the resultant, or its power-of-ten. The decimal places of a number are counted starting from zero on the digit immediately ahead of the decimal point and counted 1, 2, 3, etc. toward the left, or −1, −2, −3, toward the right, until reaching the first non-zero digit (that is the number of decimal places of 3456.7 is 3, that of 3.46 is zero and that of 0.000034 is −5. In these three cases, 3 is the first non-zero digit).

In the problem:

$$X = \frac{0.00367 \times 572. \times \overline{6.57} \times 85.}{498.} = 2.35 \times 10° = 2.35$$

The number of high-level check marks is 3 and the number of decimal places of the first, second, third and fourth high-level numbers are respectively −3, 2, 0 and 1, so the high level count is $3 - 3 + 2 + 0 + 1 = 3$. The number of check marks and the number of decimal places of the low level numbers are respectively 1 and 2 so the low level count is $1 + 2 = 3$. The high level count minus the low level count is zero and the power of ten or number of decimal places of the resultant 2.35 is zero as indicated in the problem.

For example, consider the use of a slide rule as shown in FIG. 2 to operate the following problem:

(1) $$X = \frac{367 \times 572 \times \overline{654} \times 85}{498} = 2.35 \times 10^{10-3} = 2.35 \times 10^7$$

since the first number 367 is black, the numbers 498, 572 are black because each follows a number in a different level and $\overline{654}$ is a red number and 85 is a black number because each follows a number of a different color in the same level of the problem. Number 654 is therefore marked with a dash to show its color.

Since the last number 85 is to be hairline-intersected, the slide rule resultant of the problem is to be read at the main scale under the hairline intersecting 85.

The operational steps or actions for solution of the above problem (2) are as follows:

Hairline-intersect black 367 at main scale D. Move black 498 in slider scale C to the hairline. Copy down a check mark at 498 in the problem from the black or base color check mark at facing bracket 61. Hairline-intersect black 572 at slider scale C and make a check mark at 572 from the black or base-color check mark at facing bracket 61. Now move red 654 on slider scale CI to the hairline and place a check mark at $\overline{654}$ in the problem as indicated by the red check mark at the nearest facing bracket 51. Then hairline-intersect black 85 at scale CF and copy down a check mark at 85 from the black check mark at facing bracket 32. All the check marks are thus marked down at the above problem. Read the resultant 2.35 at main scale DF under the hairline. The sum of the decimal places of the high level numbers and their check marks is ten, i.e., the sum of the digits following the first digit in each number plus three check marks, and the sum for the low level numbers is three. Thus the power of ten of the resultant is $10 - 3$ or 7, as indicated in the problem (1).

The slide rule in FIG. 1 can be similarly operated except that, when working with upper group of scales D and C, all numbers in the problem must be black numbers, that is, any previous number must be in different elevation than the following number; and when working with the lower group of scales D and CI, all numbers except the first number in the problem must be red, i.e., the second number must be in the same level with the first number and any other number should be in a different level than the next previous number. If a given problem does not satisfy the requirement for an intended group of working scales '1' or "1s" must be inserted in the problem to satisfy the requirement because the insertion of '1' or "1s" does not change the numerical value of the problem but changes the color of some of their numbers. For example, to work the problem $X = 4 \times 5 \times 6 \times 7$, with scales D and CI, "1s" should be added, so that the problem becomes:

(2) $$X = 4 \times \overline{5} \times \overline{6} \times \overline{7}$$
$$\underline{1} \times \underline{1}$$

and the number '1' should be entered into scale CI at its numeral 1. In the problem, a dash at a number denotes that the number is red. The high level black number 4 and the low level red numbers, the 1s, are to be hairline-intersected and the high red numbers are to be slider-moved to the hairline. The check marks at $\overline{5}$ and $\overline{6}$ were copied from the red check mark at the then facing bracket 11 of FIG. 1.

I claim:

1. In a slide rule comprising:
   a pair of relatively movable scale bearing members suitably secured together for parallel sliding movement so that a scale extending along the edge of one member will be visibly related with a paralleling scale on the other member;

a first conventional logarithmic scale extending over at least one order of magnitude bounded by the index 1 and extending along one edge of one of said members;

a second logarithmic scale on the other of said members paralleling and corresponding in length, direction, and magnitude with said first scale;

and an indicator movable along both said scales and extending transversely thereof, the improvement in which comprises:

a. a base colored directional symbol positioned adjacent the index 1 at the low end of said first scale disposed to point toward the numerically increasing scale direction and including the number 1;

b. a contrasting colored directional symbol positioned adjacent the index 1 at the high end of said first scale pointing toward the numerically decreasing scale direction and including the number 9.999;

c. a base colored directional symbol positioned adjacent the index 1 at the high end of said second scale pointing toward the numerically decreasing scale direction and including the number 9.999; and d. a contrasting colored directional symbol positioned adjacent the index 1 at the low end of said second scale pointing toward the numerically increasing scale direction and including the number 1.

2. A slide rule as in claim 1 wherein said scale bearing members consist of an upper and a lower part of an elongate stationary body, said parts being held in fixed relation with each other by front and rear connecting plates adjacent each end of the body, and a slider mounted between said parts and longitudinally adjustable with respect thereto, said first scale being located on one of said stationary body parts, said second scale being located on said slider, and said indicator consisting of a hairline indicator movable lengthwise above said stationary body.

3. A slide rule as in claim 2 having a third scale located on said slider and corresponding in length and magnitude to said second scale and extending in the opposite direction thereof, said third scale being positioned adjacent said second scale and said second scale directional symbols such that said second scale directional symbols are associated with both said second and third scales.

* * * * *